(12) United States Patent  (10) Patent No.: US 8,135,566 B2
Marshall et al.  (45) Date of Patent: Mar. 13, 2012

(54) DETERMINING A NODE PATH THROUGH A NODE GRAPH

(75) Inventors: Carl S. Marshall, Portland, OR (US); Adam T. Lake, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 323 days.

(21) Appl. No.: 12/482,209

(22) Filed: Jun. 10, 2009

(65) Prior Publication Data

US 2009/0237398 A1   Sep. 24, 2009

Related U.S. Application Data

(63) Continuation of application No. 10/039,425, filed on Jan. 4, 2002, now Pat. No. 7,548,241.

(51) Int. Cl.
*G06F 17/00* (2006.01)
(52) U.S. Cl. .............................. 703/6; 345/428; 345/474
(58) Field of Classification Search .................. 345/428, 345/474; 700/1, 2, 98; 703/6
See application file for complete search history.

(56) References Cited

U.S. PATENT DOCUMENTS

| | | |
|---|---|---|
| 4,600,919 A | 7/1986 | Stern |
| 4,747,052 A | 5/1988 | Hishinuma et al. |
| 4,835,712 A | 5/1989 | Drebin et al. |
| 4,855,934 A | 8/1989 | Robinson |
| 4,901,064 A | 2/1990 | Deering |
| 4,905,233 A | 2/1990 | Cain et al. |
| 5,124,914 A | 6/1992 | Grangeat |
| 5,163,126 A | 11/1992 | Einkauf et al. |
| 5,371,778 A | 12/1994 | Yanof et al. |
| 5,611,030 A | 3/1997 | Stokes |
| 5,731,819 A | 3/1998 | Gagne et al. |
| 5,757,321 A | 5/1998 | Billyard |
| 5,786,822 A | 7/1998 | Sakaibara |
| 5,805,782 A | 9/1998 | Foran |
| 5,809,219 A | 9/1998 | Pearce et al. |
| 5,812,141 A | 9/1998 | Kamen et al. |
| 5,847,712 A | 12/1998 | Salesin et al. |
| 5,872,773 A | 2/1999 | Katzela et al. |
| 5,881,243 A | 3/1999 | Zaumen et al. |
| 5,894,308 A | 4/1999 | Isaacs |
| 5,929,860 A | 7/1999 | Hoppe |
| 5,933,148 A | 8/1999 | Oka et al. |
| 5,949,969 A | 9/1999 | Suzuoki et al. |
| 5,966,133 A | 10/1999 | Hoppe |
| 5,966,134 A | 10/1999 | Arias |
| 5,974,423 A | 10/1999 | Margolin |
| 5,999,189 A | 12/1999 | Kajiya et al. |

(Continued)

OTHER PUBLICATIONS

He, Yefei, "Real-time Visualization of Dynamic Terrain for Ground Vehicle Simulation", PH.D. Thesis, University of Iowa, 2000.*

(Continued)

*Primary Examiner* — Kakali Chaki
*Assistant Examiner* — Carlos Ortiz Rodriguez
(74) *Attorney, Agent, or Firm* — Hinchliffe IP Law LLC (57) ABSTRACT

Determining a node path through a node graph includes modifying the node graph in accordance with a predetermined platform performance, performing a path finding process through the node graph to obtain the node path, determining if the platform performance has changed, adjusting the node graph to compensate for a change in the platform performance, and re-performing the path finding process through the adjusted node graph to obtain the node path.

26 Claims, 7 Drawing Sheets

U.S. PATENT DOCUMENTS

| | | | |
|---|---|---|---|
| 6,054,999 A | 4/2000 | Strandberg | |
| 6,057,859 A | 5/2000 | Handelman et al. | |
| 6,078,331 A | 6/2000 | Pulli et al. | |
| 6,098,107 A | 8/2000 | Narvaez-Guarnieri et al. | |
| 6,115,050 A | 9/2000 | Landau et al. | |
| 6,175,655 B1 | 1/2001 | George et al. | |
| 6,191,787 B1 | 2/2001 | Lu et al. | |
| 6,191,796 B1 | 2/2001 | Tarr | |
| 6,198,486 B1 | 3/2001 | Junkins et al. | |
| 6,201,549 B1 | 3/2001 | Bronskill | |
| 6,208,347 B1 | 3/2001 | Migdal et al. | |
| 6,219,070 B1 | 4/2001 | Baker et al. | |
| 6,239,808 B1 | 5/2001 | Kirk et al. | |
| 6,252,608 B1 | 6/2001 | Snyder et al. | |
| 6,262,737 B1 | 7/2001 | Li et al. | |
| 6,262,739 B1 | 7/2001 | Migdal et al. | |
| 6,292,192 B1 | 9/2001 | Moreton | |
| 6,292,194 B1 | 9/2001 | Powell, III | |
| 6,317,125 B1 | 11/2001 | Persson | |
| 6,337,880 B1 | 1/2002 | Cornog et al. | |
| 6,388,670 B2 | 5/2002 | Naka et al. | |
| 6,401,038 B2 * | 6/2002 | Gia | 701/301 |
| 6,405,071 B1 | 6/2002 | Analoui | |
| 6,421,051 B1 * | 7/2002 | Kato | 345/428 |
| 6,437,782 B1 | 8/2002 | Pieragostini et al. | |
| 6,478,680 B1 | 11/2002 | Yoshioka et al. | |
| 6,559,848 B2 | 5/2003 | O'Rourke | |
| 6,573,890 B1 | 6/2003 | Lengyel | |
| 6,593,924 B1 | 7/2003 | Lake et al. | |
| 6,593,927 B2 | 7/2003 | Horowitz et al. | |
| 6,608,627 B1 | 8/2003 | Marshall et al. | |
| 6,608,628 B1 | 8/2003 | Ross et al. | |
| 6,970,171 B2 | 11/2005 | Baraff et al. | |
| 7,050,904 B2 | 5/2006 | Powell et al. | |
| 2001/0026278 A1 | 10/2001 | Arai et al. | |
| 2002/0101421 A1 | 8/2002 | Pallister | |

OTHER PUBLICATIONS

"pmG Introduces Messiah: Animate 3.0", URL: http://www.digitalproducer.com/aHTM/Articles/july_2000/july_17_00/pmg_intros_messiah_animate.htm (Accessed Oct. 26, 2004) 2 pgs.

"Advogato's Trust Metric", www.advogato.org, 2000.

Alliez, et al., "Progressive Compression for Lossless Transmission of Triangle Meshes," University of Southern California, Los Angeles, CA, pp. 195/202, Aug. 2001.

Appel, Arthur, "The Notion of Quantitative Invisibility and the Machine Rendering of Solids." Proceedings of 22nd National Conference Association for Computing Machinery 1967.

Bajaj, et al., "Progressive Compression and Transmission of Arbitrary Triangular Meshes," Department of Computer Sciences, University of Texas at Austin, Austin TX, pp. 307/316, 1999.

Bandi et al., "Path finding for human motion in virtual environments", Elsevier Science 2000.

Bandi et al., "Space discretization for efficient human navigation", Swiss Federal Institute of Technology, 1998.

Bandi et al., "The use of space discretization for autonomous virtual humans", Swiss Federal Institute of Technology, 1998.

Brockington, Mark, "Pawn Captures Wyvern: How Computer Chess Can Improve Your Pathfinding", Gama Network, 2000.

Buck, et al., "Performance/Driven Hand/Drawn Animation," ACM (NPAR2000), pp. 101/108 (2000).

Catmull et al., "Recursively Generated B/Spline Surfaces on Arbitrary Topological Meshes," Computer Aided Geometric Design, 10(6):350 / 355 (1978).

Chow, "Optimized Geometry Compression for Real/time Rendering." Massachusetts Institute of Technology, Proceedings Visualization 1997, Oct. 19-24, 1997, Phoenix, AZ: 347/354.

Coelho et al., "An Algorithm for Intersecting and Trimming Parametric Meshes", ACM SIGGRAPH pp. 1 / 8 (1998).

Cohen/Or, et al., "Progressive Compression of Arbitrary Triangular Meshes," Computer Science Department, School of Mathematical Sciences,, Tel Aviv, Israel, Oct. 1999.

Deering, M., "Geometry Compression," Computer Graphics. SIGGRAPH '95, pp. 13/20, 1995.

DeRose et al., "Subdivisional Surfaces in Character Animation", ACM, SIGGRAPH'98, pp. 85 / 94 (1998).

Dyn, N., Levin, D., and Gregory, J.A. "A Butterfly Subdivision Scheme for Surface Interpolation with Tension Control." *ACM Transactions on Graphics*, vol. 9, No. 2 (1990).

Egbert et al., "Collision/Free Object Movement Using Vector Fields", Brigham Young University, 1996.

Elber, "Line Art Rendering via a Coverage of Isoperimetric Curves." *IEEE Transactions on Visualization and Computer Graphics*, vol. 1, Department of Computer Science, Technion, Israel Institute of Technology, Haifa, Israel (Sep. 1995).

Elber, Gershon, "Interactive Line Art Rendering of Freeform Surfaces", Eurographics'99, 18(3):C1 / C12 (1999).

Foley et al., "Computer graphics: principal and practice." *Addison/Wesley Publishing Company*, Reading, MA, 1996: 1060/1064.

Frohlich et al., "Autonomous and Robust Navigation for Simulated Humanoid Characters in Virtual Environments", IEEE, 2002.

Garcia/Luna/Aceves, "A Path/Finding Algorithm for Loop/Free Routing", IEEE, 1997.

Garland et al., "Surface simplification using quadratic error metrics", IEEE, 1997.

Gooch et al., "A Non/Photorealistic Lighting Model for Automatic Technical Illustration," Computer Graphics Proceedings, Annual Conference Series, SIGGRAPH'98, pp. 447/452 (1998).

Gooch et al., "Interactive Technical Illustration," ACM Interactive 3D, pp. 31 / 38 (1999).

Heidrich et al., "Realistic, Hardware/Accelerated Shading and Lighting," ACM, (SIGGRAPH'99), pp. 171 / 178 (1999).

Hoppe, "Efficient Implementation of progressive meshes." *Coput. & Graphics*, vol. 22, No. 1: 27/36 (1998).

Hoppe, "Progressive Meshes," Microsoft Research: pp. 99/108, Web: http://www.research.rnicrosoft.com/research/graphics/hoppe/, 1996.

Hoppe, "View/Dependent Refinement of Progressive Meshes," Microsoft Research, Web: http://research.microsoft.com/~hoppe/, 1997.

Hoppe, Hugues, "Smooth View/Dependent Level/of/Detail Control and its Application to Terrain Rendering", IEEE Visualization, 1998.

Hoppe, Hughes, Research Interests, http://research.microsoft.com/~hoppe/#pm, 2008.

Kumar et al., "Interactive Display of Large Scale NURBS Models", ACM, Symp. on Interactive 3D Graphics, pp. 51 / 58 (1995).

Lake et al., "Stylized Rendering Techniques for Scalable Real/Time 3D Animation", 2000.

Lander, Jeff, "Making Kine More Flexible," Game Developer Magazine, 5 pgs., Nov. 1998.

Lander, Jeff, "Skin Them Bones," Game Developer Magazine, 4 pgs., May 1998.

Landsdown et al., "Expressive Rendering: A Review of Nonphotorealistic Techniques" *IEEE Computer graphics and Applicatons*: 29/37 (1995).

Lasseter, "Principles of Traditional Animation Applied to 3D Computer Animation" *Pixar*, San Rafael, California, 1987.

Lee, "Navigating through Triangle Meshes Implemented as Linear Quadtrees" Computer Science Department, Center for Automation Research, Institute for Advanced Computer Studies, University of Maryland College Park, MD, Apr. 1998.

Leung et al., "Interactive viewing of 3D terrain models using VRML", Syracuse University, 1998.

Lewis, "Pose Space Deformation: A Unified Approach to Shape Interpolation and Skeleton/Driven Deformation." Centropolis, New Orleans, LA, pp. 165/172, 2000.

Lonzano/Perez et al., "An Algorithm for Planning Collision/Free Paths Among Polyhedral Obstacles", ACM, 1979.

Ma et al., "Extracting Feature Lines for 3D Unstructured Grids" Institute for Computer Applications in Science and Engineering (ICASE), NASA Langley Research Center, Hampton, VA, *IEEE* (1997).

Markosian, et al., "Real/Time Nonphotorealistic Rendering," Brown University site of the NSF Science and Technology Center for Computer Graphics and Scientific Visualization, Providence, RI, 1997.

Pajarola et al., "Compressed Progressive Meshes" Graphics, Visualization & Usability Center, College of Computing, Georgia Institute of Technology, Jan. 1999.

Pedersen, "A Framework for Interactive Texturing on Curved Surfaces", ACM, pp. 295 / 301 (1996).

Popovic, et al., "Progressive Simplicial Complexes," Microsoft Research, Web: http://www.researeh.microsoft.com/~hoppe/, 1997.

Pueyo, X. et al., "Rendering Techniques '96," Proc. of Eurographics Rendering Workshop 1996, Eurographics, pp. 61 / 70 (1996).

Raskar, "Image Precision Silhouette Edges" University of North Carolina at Chapel Hill, *Microsoft Research*, 1999 Symposium on Interactive 3D Graphics Atlanta, GA: 135/231 (1999).

Rockwood, A. et al., "Real/time Rendering of Trimmed Surfaces," Computer Graphics (SIGGRAPH '89 Proceedings) 23:107 / 116 (1989).

Samet, "Applications of spatial data structures: computer graphics, image processing, and GIS." University of Maryland, *Addison/Wesley Publishing Company*, Reading, MA: 1060/1064 (Jun. 1990).

Sousa, M., et al., "Computer/Generated Graphite Pencil Rendering of 3/D Polygonal Models", Eurographics'99, 18(3):C195 / C207 (1999).

Stam, J., "Exact Evaluation of Catmull/Clark Subdivision Surfaces at Arbitrary Parameter Values", SIGGRAPH 98 Conference Proceedings, Annual Conference Series, pp. 395/404 (1998).

Taubin et al., "3D Geometry Compression", SIGGRAPH'98 Course Notes (1998).

Taubin, et al., "Progressive Forest Split Compression," IBM T.J. Watson Research Center, Yorktown Heights, NY, 1998.

Thalmann et al., "Computer Animation in Future Technologies", University of Geneva, 1996.

Thomas et al., "The Illusion of Life: Disney Animation," *Hyperion*, 3:47/71, New York, NY (1981).

To et al., "A method for Progressive and Selective Transmission of Multi/Resolution Models", AGM 1999.

Ware et al., "Layout for Visualizing Large Software Structures in 3D", University of New Brunswick, 2000.

Wilhelms, J. & Van Gelder, A., "Anatomically Based Modeling," Univ. California Santa Cruz [online], 1997 [retrieved Dec. 22, 2004], retrieved from the Internet: <URL: http://graphics.stanford.edu/courses/cs448/01/spring/papers/wilhelms.pdf>.

Zeleznik et al., "Sketch: An Interface for Sketching 3D Scenes." Brown University site of the NSF Science and Technology Center for Computer Graphics and Scientific Visualization (1996).

Zorin, D., Schroeder, P., and Sweldens, W. "Interpolating Subdivision for Meshes of Arbitrary Topology." Tech. Rep. CS/TR/96/06, Caltech, Department of Computer Science, (1996).

Alliez et al., "Progressive Compression for Lossless Transmission of Triangle Meshes", University of Southern California, Los Angeles, CA: 1951202, 2001.

Hoppe, "Progressive Simplicial Complexes", Microsoft Research, 1997 http://www.research.microsoft.com/~hoppe/.

Thomas (Contributor) et al., "The Illusion of Life: Disney Animation" 47/51, 1995.

* cited by examiner

DETERMINING A NODE PATH THROUGH A NODE GRAPH

RELATED APPLICATIONS

This patent application is a continuation application and claims priority to U.S. application Ser. No. 10/039,425, filed on Jan. 4, 2002 (to issue as U.S. Pat. No. 7,548,241 on Jun. 16, 2009). The contents of U.S. application Ser. No. 10/039,425 are hereby incorporated by reference into this patent application as if set forth herein in full.

TECHNICAL FIELD

This invention relates to determining a node path through a node graph relating to a three-dimensional (3D) mesh.

BACKGROUND

A 3D mesh is made up of one or more polygons that define a surface, such as a terrain. The number of polygons in the 3D mesh may be increased, resulting in increased resolution, or decreased, resulting in decreased resolution. Increasing the number of polygons in the 3D mesh increases the resolution of the surface by making the surface more detailed and decreasing the number of polygons in the 3D mesh decreases the resolution of the surface by making the surface less detailed.

Decreasing the resolution of the surface can increase rendering performance, particularly on low-end hardware. That is, since there are fewer polygons to process, the 3D mesh can be manipulated using a less powerful graphics processor and/or using fewer processor cycles. This could also relate to a node graph defined by a 3D mesh.

DESCRIPTION OF DRAWINGS

FIG. 1 is view of a 3D mesh.

FIG. 2 is a view of a surface terrain represented by the 3D mesh.

FIG. 3 is a view of a polygon in the 3D mesh.

FIG. 4 is a flowchart showing a process for determining a node path through the 3D mesh.

FIG. 5 is a view of several polygons in the 3D mesh.

FIG. 6 is a view of a reduced-resolution (fewer polygons) version of the 3D mesh.

FIG. 7 is a view of a computer system on which the process of FIG. 4 may be implemented.

Like reference numerals in different figures indicate like elements.

DETAILED DESCRIPTION

A 3D mesh may be used to represent a node graph. In this context, a node graph is a collection of nodes that define features of an environment, such as a terrain. The nodes may be positioned in 3D space to define the length, width and height of environmental features. An animated model traverses the node graph by "interpolating" through the nodes, which means that they are moving in between the nodes. Also, the nodes can be control points for a spline which the model uses as a node path. In this regard, a route that the model takes through the node graph is referred to as the node path.

Referring to FIG. 1, a 3D mesh 10, which may be used to represent a node graph of a terrain, is comprised of interconnecting polygons 12. Polygons 12 are triangles in this embodiment; however, other types of polygons, such as quadrilaterals, may be used instead of triangles.

3D mesh 10 defines a polygonal surface 14 (FIG. 2), here mountainous terrain, that can be traversed by a 3D model, such as a video game character. The polygonal surface and/or a corresponding node graph can be created via a parametric surface. The 3D data for surface 14 defines interconnecting polygons 12 that make up 3D mesh 10. A node graph for surface 14 is defined using polygons 12. That is, polygons in 3D mesh 10 are defined to be nodes within the node graph. Each polygon may be assigned a node or the nodes may be dispersed throughout 3D mesh 10 on non-adjacent polygons.

A node graph may contain one or more blocking nodes. A blocking node defines a point through which a 3D model cannot pass while traversing the node graph (via a node path). Data is associated with each blocking node, which indicates that a 3D model along the node path cannot pass through the blocking node. The 3D model thus must go around the blocking node, rather than through it. Examples of objects defined by blocking nodes can include a tree, a wall, a building, a mountain, or any other non-permeable objects.

Referring to FIG. 3, the 3D data for a polygon 12 in 3D mesh 10 defines coordinates for three vertices 16*a*, 16*b* and 16*c* positioned in Cartesian XYZ (or other) 3D space. These vertices define a face 18 for polygon 12. The 3D data also defines a unit normal vector 20*a*, 20*b* and 20*c* to each vertex 16*a*, 16*b* and 16*c* and a unit normal vector 18*a* to face 18. The unit normal vectors for face 18 and vertices 16*a*, 16*b* and 16*c* have a magnitude of one and are orthogonal (i.e., normal) to face 18. These vectors are used to determine the shading of polygon 12 from a virtual light source.

Referring to FIGS. 1 and 2, a node path 22 is also defined through 3D mesh 10. As noted, a node path is a route that is defined through a node graph. In the example of FIG. 1, node path 22 is a trail through surface 14.

Generally, a node path contains a starting node and a destination node. The starting node is the start point of the node path and may be associated with a node (in this case, a polygon of 3D mesh 10) at the beginning of the node path. The start and end of the node path are defined by the intended movement of a 3D model along the node path from an initial position to a destination. In the example shown in FIG. 1, polygon 24 contains the start node.

The destination node is the end point of the node path and may be associated with a node (in this case, a polygon of 3D mesh 10) at the end of the node path. In the example shown in FIG. 1, polygon 26 contains the destination node.

Node path 22 may be defined by the data that makes up the node graph associated with 3D mesh 10. For example, the nodes of the node graph, and thus node path 22, may be located at centers of polygons on the path or at vertices of polygons on the path. Alternatively, the nodes of the node graph may be defined by data that is separate from 3D mesh 10. In this case, the node graph is superimposed over the appropriate portion of 3D mesh 10. Node graphs that are separate from the 3D mesh may contain associations to vertices on the mesh. Therefore, changing the 3D mesh also results in corresponding changes in the node graph (and thus, the node path). Consequently, node graphs that are defined by data that is separate from the 3D mesh can be processed similarly to node graphs that are defined by data associated with the 3D mesh.

Referring to FIG. 4, a process 28 is shown for determining a node path through a node graph, such as 3D mesh 10. Process 28 however, is not limited to use with a node graph defined by a 3D mesh, but rather can be used with any type of node graph defined by 3D or two-dimensional (2D) data.

In this embodiment, process 28 contains two stages: a pre-processing stage 30 and a run-time stage 32. Pre-processing stage 30 can be performed only once for a 3D animation sequence having multiple frames to be processed. If desired, pre-processing stage 30 can be performed several times randomly or at pre-specified time intervals. Run-time stage 32 is performed for each frame of an animation sequence.

Figure 1:
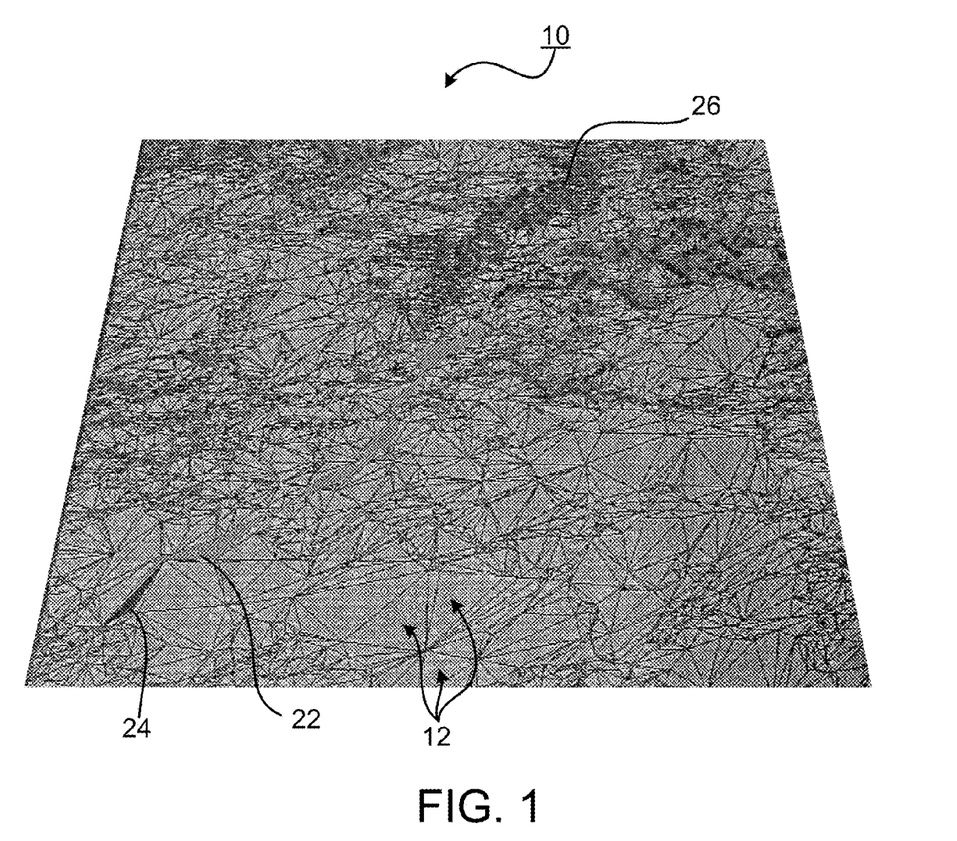
Figure 2:
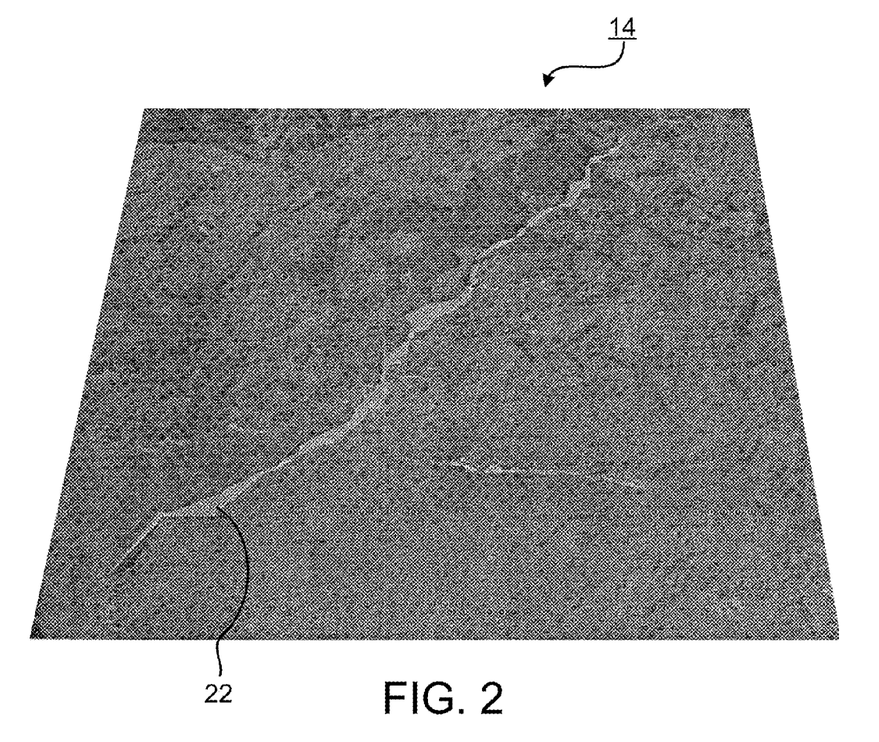
Figure 3:
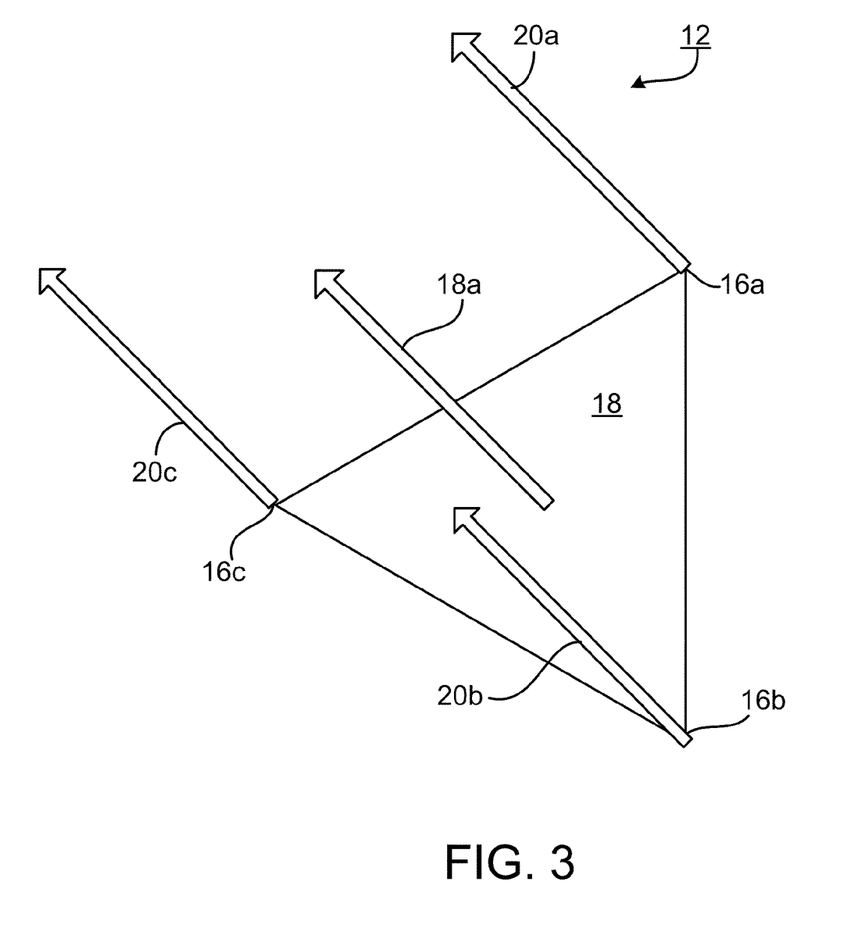
Figure 4:
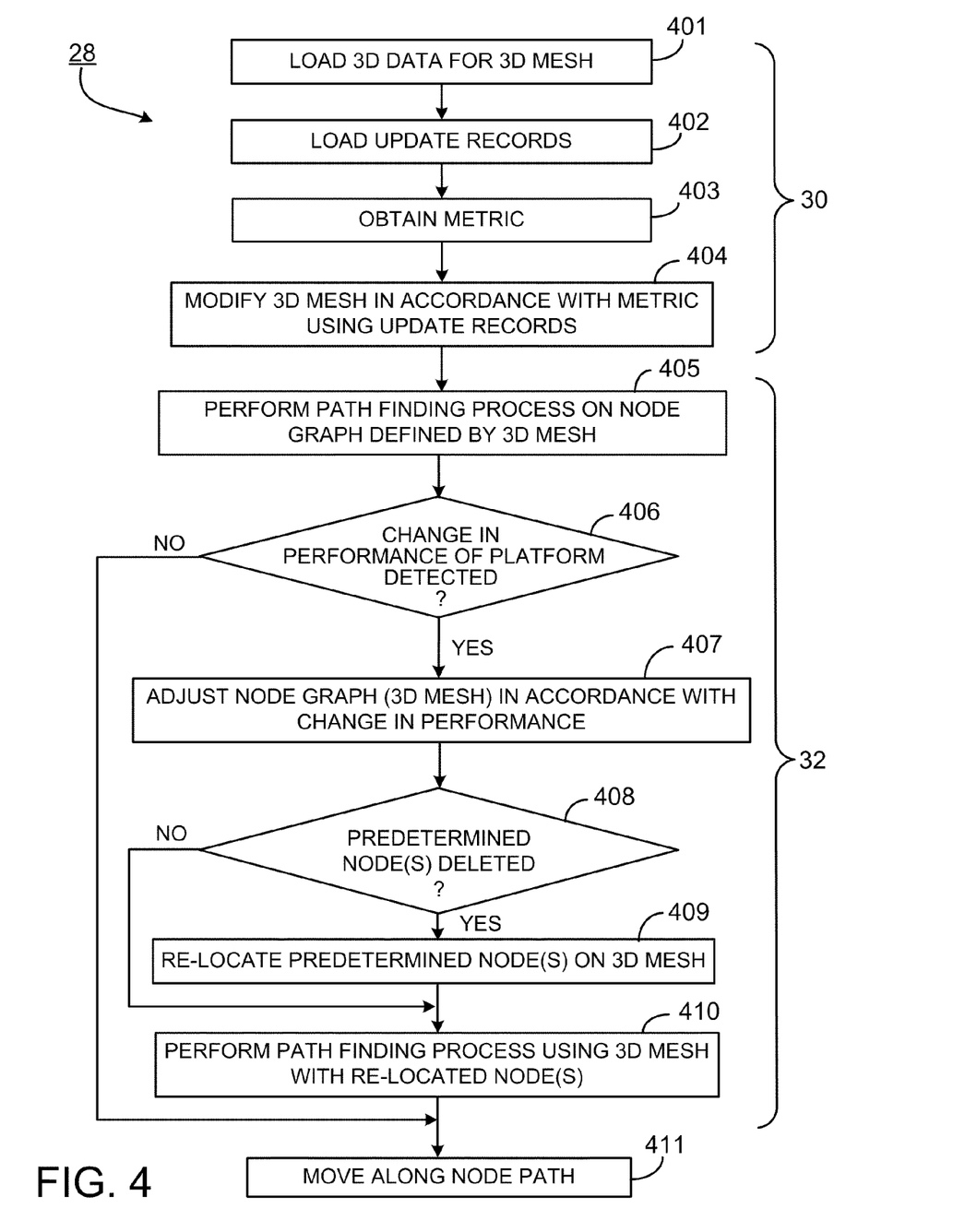

Process 28 will be described with respect to 3D mesh 10 (FIG. 1) and surface 14 (FIG. 2). It is assumed that a node graph, and thus node path 22, through 3D mesh 10/surface 14 is defined by the 3D data that makes up 3D mesh 10.

In pre-processing stage 30, process 28 loads (401) 3D data for an animation sequence that includes 3D mesh 10. In this example, 3D mesh 10 is a single frame of the animation sequence. The 3D data includes the polygon structures shown in FIG. 1, along with data defining the node graph on 3D mesh 10. The 3D data may be loaded from memory into, e.g., a computer processing unit (CPU) that runs process 28.

Process 28 loads (402) update records into the CPU. The update records specify the number and locations of polygons to remove, combine, or divide when adjusting the node graph through 3D mesh 10. As described below, the node graph is adjusted by changing the number of polygons in 3D mesh 10 using the update records.

Process 28 obtains (403) a metric that affects the way that process 28 operates. The metric may be obtained in any manner. For example, the metric may be retrieved from memory, downloaded from a network, or received via a graphical user interface (GUI) (not shown). In this embodiment, the metric relates to the performance of a platform (e.g., a CPU, graphics processor, operating system, or the like) that is running process 28. The metric may specify a frame rate for the animation sequence that contains the node graph, in this case that contains 3D mesh 10. For example, the metric may require the platform to maintain a frame rate of thirty frames-per-second during the animation sequence.

Process 28 modifies (404) 3D mesh 10, and thus the node graph, in accordance with the metric. Process 28 modifies (404) the 3D mesh by changing the number of polygons that make up 3D mesh 10. The number of polygons may be increased or decreased at this point. To increase the number of polygons, a standard subdivision technique may be used. This would be done, e.g., for high-speed processors that are capable of handling large amounts of data. For the sake of illustration, however, it is assumed here that process 28 starts with a highest resolution 3D mesh and, therefore, the number of polygons is reduced, thereby reducing the resolution of the node graph. A reduction in the number of polygons in 3D mesh 10 enables the CPU or graphics processor running process 28 to comply with the metric (minimum frame rate).

Figure 5:
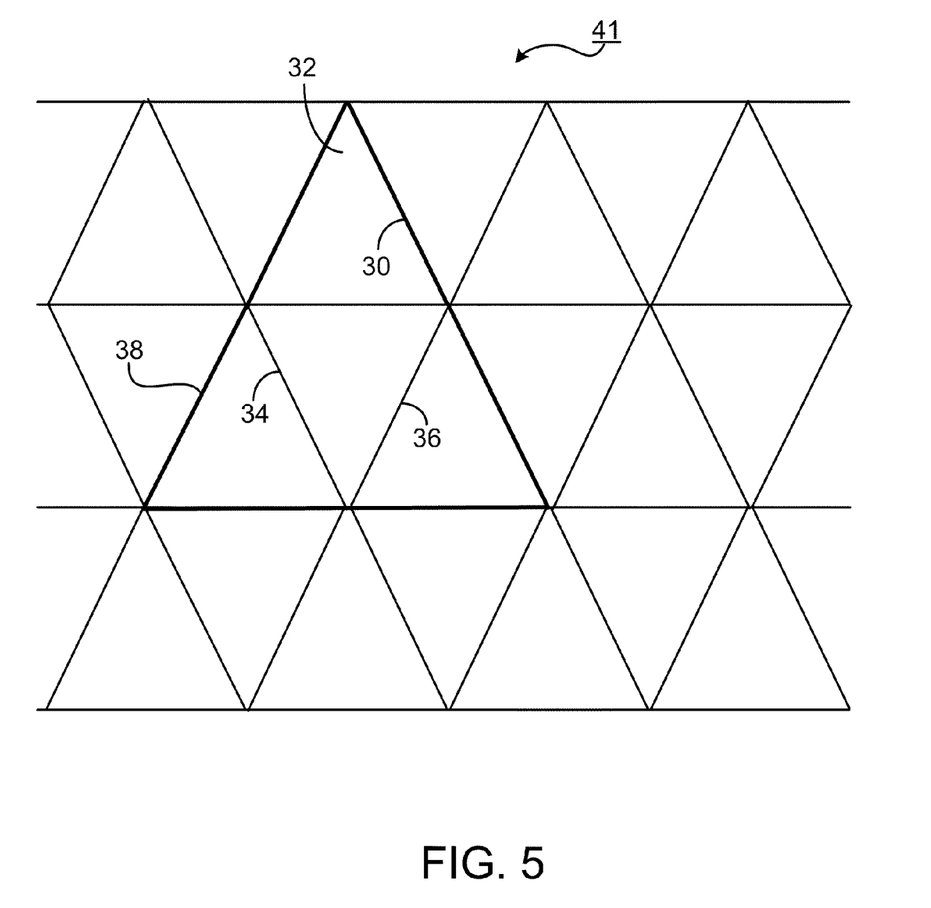

One technique that may be used to reduce the resolution of 3D mesh 10 is the multi-resolution mesh (MRM) technique. This technique involves removing vertices of polygons defined by the update records, particularly vertices that are interior to a 3D mesh, and then connecting unconnected vertices to form new, larger polygons. By way of example, as shown in FIG. 5, edge 30 of polygon 32 is interior to 3D mesh 41. Consequently, its removal will not have a dramatic effect either way on the resolution of the 3D mesh. Accordingly, edge 30 can be removed, along, e.g., with edges 34 and 36, by removing their respective vertices and combining the smaller polygons and produce a larger polygon 38.

Process 28 performs (405) a path finding process on the node graph defined by modified 3D mesh 10. The path finding process determines the path 22 a 3D model should take through the node graph defined by modified 3D mesh 10 to go from a predetermined starting point to a predetermined destination. Typically, the shortest route is determined; however, this is not a requirement. Examples of standard path finding processes that may be used include the A* process, the Dijkstra process, the depth-first process, and the breadth-first process. Typically, path finding processes begin at a "start" node, examine nodes around the start node, and determine which node has the least cost in terms of distance keeping the destination node in mind. The path finding process then advances to that node and repeats itself until it reaches the destination node.

Process 28 determines (406) if there is a change in the performance of the platform during the animation sequence. A change in the performance of the platform may result from any number of occurrences. For example, other computer programs running at the same time as the animation sequence may drain the platform's resources, resulting in a change in the platform's performance. Generally speaking, a change in performance refers to deterioration in performance; however, an increase in performance may also be detected.

If process 28 detects a change in performance of the platform, process 28 adjusts (407) the node graph by adjusting 3D mesh 10 in accordance with the change in performance, e.g., to compensate for the change in performance. For example, the performance of the platform may deteriorate such that the platform can only run twenty frames-per-second of animation. In this case, process 28 may reduce the number of polygons in the 3D mesh, and thereby adjust the node graph.

Because there are fewer polygons to process, the platform will be able to increase the number of frames that it can process per second. Conversely, if the performance of the platform increases, process 28 may increase the number of polygons in the 3D mesh, thereby providing enhanced resolution for higher-powered machines.

Figure 6:
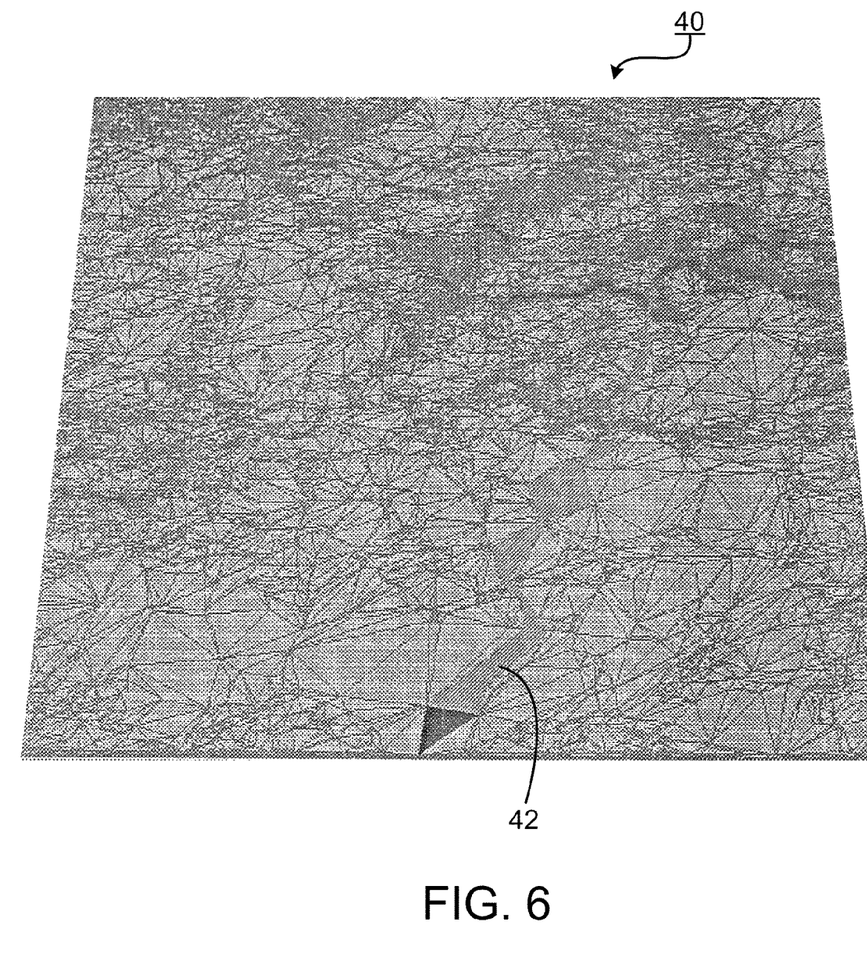

In this example, to adjust the node graph, process 28 generates a new, lower-resolution version of 3D mesh 10. An example of a new version of 3D mesh 10 is shown in FIG. 6 and is labeled 40 to avoid confusion with the version shown in FIG. 1. 3D mesh 40 includes an adjusted node graph, and thus an adjusted node path 42. Adjusted node path 42 (FIG. 6) differs from node path 22 (FIG. 1) in that adjusted node path 42 is defined by fewer polygons than node path 22.

Process 28 determines (408) if one or more predetermined types of nodes has been removed by adjusting (407) the node graph. In this context, such nodes include a start node, a destination node, and/or a blocking node. If one (or more) of these nodes has been removed from the 3D mesh, process 28 re-locates (409) the node on the 3D mesh and performs (410) the path finding process on the node graph with the re-located node. What is meant by "re-locate" in this context is to re-define the location of the predetermined node, which may, or may not, mean moving from a current path position.

Process 28 may re-locate (409) the node as follows. Process 28 may obtain a position on the adjusted 3D mesh 40 that corresponds to the node that was deleted, e.g., the original position of the node on 3D mesh 10. Process 28 may assign the node to a polygon in the 3D mesh that is closest to the original position. Process 28 may assign the node to the candidate that is closer to the destination node.

Alternatively, process 28 may re-locate (409) the node as follows. Process 28 may obtain a current position of the path finding process on 3D mesh 40 and assign the predetermined node in accordance with the current position. For example, if process 28 determines that a node is missing because it was not encountered at an expected position, process 28 determines its current location on the node graph and assigns the missing node to a polygon nearest the current location. This technique is particularly applicable if the change in performance is detected during the path finding process.

If, on the other hand, none of the predetermined nodes has been deleted, process 28 simply re-performs the path finding process on the adjusted node graph, i.e., 3D mesh 40, in order to obtain node path 42.

Once the node path has been determined, process 28 moves (411) a 3D model along the node path.

Figure 7:
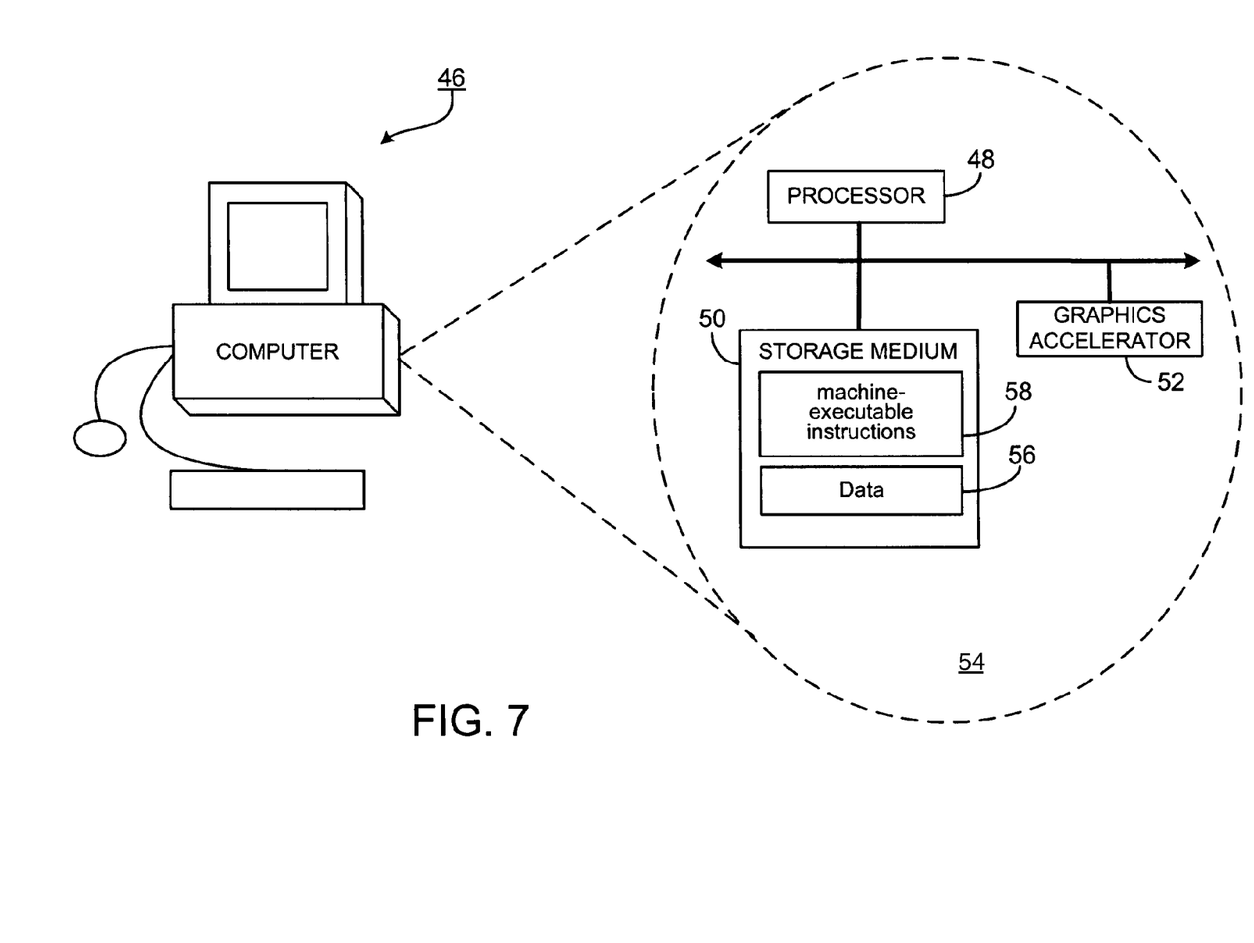

FIG. 7 shows a computer 46 for determining a node path and for rendering 3D models using process 28. Computer 46 includes a processor 48, a storage medium 50 (e.g., a hard disk), and a 3D graphics accelerator 52 for processing 3D data (see view 54). Storage medium 50 stores 3D data 56 that defines an animation sequence that includes 3D mesh 10, and machine-executable instructions 58 for performing process 28. Processor 48 and/or graphics accelerator 52 execute instructions 58 to perform process 28 on 3D mesh 10.

Process 28, however, is not limited to use with any particular hardware or software configuration; it may find applicability in any computing or processing environment. Process 28 may be implemented in hardware, software, or a combination of the two. Process 28 may be implemented in one or more computer programs executing on programmable computers that each include a processor, a storage medium readable by the processor (including volatile and non-volatile memory and/or storage elements), at least one input device, and one or more output devices. Program code may be applied to data entered using an input device to perform process 28 and to generate output information. The output information may be applied to one or more output devices.

Each such program may be implemented in a high level procedural or object-oriented programming language to communicate with a computer system. However, the programs can be implemented in assembly or machine language. The language may be a compiled or an interpreted language.

Each computer program may be stored on an article of manufacture, e.g., a storage medium, such as a CD-ROM, hard disk, or magnetic diskette, that is readable by a general or special purpose programmable computer for configuring and operating the computer when the storage medium or device is read by the computer to perform process 28. Process 28 may also be implemented as a computer-readable storage medium, configured with a computer program, where, upon execution, instructions in the computer program cause the computer to operate in accordance with process 28.

Process 28 is not limited to the embodiments described herein. The blocks of process 28 are not limited to the order shown. Blocks in the run-time stage may also be performed in the pre-processing stage and vice versa. Process 28 can be used with any type of 3D mesh, not just surface terrains. For example, process 28 may be used to determine a node path through a maze in a video game. Metrics other than those described above may be used.

Other embodiments not described herein are also within the scope of the following claims.

What is claimed is:

1. A method comprising:
   detecting a change in performance of a platform on which an animation sequence runs, the platform comprising computer hardware;
   adjusting, during the animation sequence, a three-dimensional (3D) mesh that defines a node graph for the animation sequence, the 3D mesh being adjusted to compensate for the change in performance by increasing a number of polygons in the 3D mesh if the performance of the platform increases and by decreasing the number of polygons in the 3D mesh if the performance of the platform decreases; and
   performing a path finding process after the 3D mesh is adjusted to determine a path that a 3D model in the animation sequence should take through the adjusted 3D mesh, the path including a start node corresponding to a polygon of the 3D mesh and a destination node corresponding to a different polygon of the 3D mesh, the start node and the destination node comprising nodes of the node graph;
   wherein when the node graph comprises data that is separate from the 3D mesh, nodes of the node graph are superimposed over the 3D mesh and contain data related to vertices of the 3D mesh;
   wherein when the node graph comprises data associated with the 3D mesh, nodes of the node graph are located at centers of polygons of the 3D mesh or at vertices of the 3D mesh.

2. The method of claim 1, wherein the change in performance of the platform relates to how many frames of the animation sequence the platform can process in a time period.

3. The method of claim 1, wherein decreasing the number of polygons in the 3D mesh comprises removing vertices of polygons that are interior to the 3D mesh and connecting unconnected vertices to form polygons that are larger than polygons that existed before the vertices were removed.

4. The method of claim 1, wherein increasing the number of polygons in the 3D mesh comprises subdividing existing polygons in the 3D mesh to produce polygons that are smaller than polygons that existed prior to the subdividing.

5. The method of claim 1, wherein the path finding process comprises:
   determining that a first node having a significance has been removed from the 3D mesh as a result of adjusting the 3D mesh;
   assigning the significance to a second node in the 3D mesh; and
   determining the path that the 3D model should take through the animation sequence using the second node in place of the first node.

6. The method of claim 5, further comprising:
   selecting, as the second node, a node that is closest, in the 3D mesh, to the first node.

7. The method of claim 5, further comprising:
   obtaining a position of the 3D model on the 3D mesh after adjusting the 3D mesh; and
   selecting the second node based on traversal of the 3D model through the adjusted 3D mesh.

8. A method comprising:
   generating an original three-dimensional (3D) mesh, the original 3D mesh representing terrain that is traversed by a 3D model in an animation sequence, the original 3D mesh comprising polygons, at least some of the polygons corresponding to nodes of a node graph, wherein when the node graph comprises data that is separate from the original 3D mesh, nodes of the node graph are superimposed over the original 3D mesh and contain data related to vertices of the original 3D mesh, wherein when the node graph comprises data associated with the original 3D mesh, nodes of the node graph are located at centers of polygons of the original 3D mesh or at vertices of the original 3D mesh;
   adjusting the original 3D mesh by changing a size of the polygons;
   determining that one or more nodes of significance have been removed from the original 3D mesh as a result of adjusting the original 3D mesh, the one or more nodes of significance for affecting a path of the 3D model through the original 3D mesh, the one or more nodes of significance including at least one of a start node or a destination node of the path, the start node corresponding to a polygon of the 3D mesh and the destination node corresponding to a different polygon of the 3D mesh, the start node and the destination node comprising nodes of the node graph;

assigning one or more nodes in the adjusted 3D mesh the significance of the one or more nodes in the original 3D mesh;

running the animation sequence to allow the 3D model to traverse the adjusted 3D mesh taking into account significance of the one or more nodes in the adjusted 3D mesh; and displaying the animation sequence on a display screen.

9. The method of claim 8, wherein the one or more nodes of significance in the original 3D mesh comprise one of more of a start node from which the 3D model traverses the 3D mesh, a destination node indicating an ending point on a path of the 3D model through the 3D mesh, and a blocking node that defines a point through which the 3D model cannot pass.

10. The method of claim 8, wherein changing the size of the polygons comprises removing vertices of polygons that are interior to the original 3D mesh and connecting unconnected vertices to form polygons in the adjusted 3D mesh that are larger than polygons that existed before the vertices were removed.

11. The method of claim 8, wherein changing the size of the polygons comprises subdividing existing polygons in the original 3D mesh to produce polygons in the adjusted 3D mesh that are smaller than polygons that existed prior to the subdividing.

12. The method of claim 8, wherein the 3D mesh is adjusted while the animation sequence is being run.

13. The method of claim 8, wherein the original 3D mesh is adjusted in response to a change in performance of a hardware platform running the animation sequence in order to maintain a substantially steady frame rate in the animation sequence.

14. An article comprising a computer program product having stored therein instructions that are executable to:

detect a change in performance of a platform on which an animation sequence runs, the platform comprising computer hardware;

adjust, during the animation sequence, a three-dimensional (3D) mesh that defines a node graph for the animation sequence, the 3D mesh being adjusted to compensate for the change in performance by increasing a number of polygons in the 3D mesh if the performance of the platform increases and by decreasing the number of polygons in the 3D mesh if the performance of the platform decreases; and perform a path finding process after the 3D mesh is adjusted to determine a path that a 3D model in the animation sequence should take through the adjusted 3D mesh, the path including a start node corresponding to a polygon of the 3D mesh and a destination node corresponding to a different polygon of the 3D mesh, the start node and the destination node comprising nodes of the node graph;

wherein when the node graph comprises data that is separate from the 3D mesh, nodes of the node graph are superimposed over the 3D mesh and contain data related to vertices of the 3D mesh;

wherein when the node graph comprises data associated with the 3D mesh, nodes of the node graph are located at centers of polygons of the 3D mesh or at vertices of the 3D mesh.

15. The article of claim 14, wherein the change in performance of the platform relates to how many frames of the animation sequence the platform can process in a time period.

16. The article of claim 14, wherein decreasing the number of polygons in the 3D mesh comprises removing vertices of polygons that are interior to the 3D mesh and connecting unconnected vertices to form polygons that are larger than polygons that existed before the vertices were removed.

17. The article of claim 14, wherein increasing the number of polygons in the 3D mesh comprises subdividing existing polygons in the 3D mesh to produce polygons that are smaller than polygons that existed prior to the subdividing.

18. The article of claim 14, wherein the path finding process comprises:

determining that a first node having a significance has been removed from the 3D mesh as a result of adjusting the 3D mesh;

assigning the significance to a second node in the 3D mesh; and determining the path that the 3D model should take through the animation sequence using the second node in place of the first node.

19. The article of claim 18, further comprising instructions to:

select, as the second node, a node that is closest, in the 3D mesh, to the first node.

20. The article of claim 18, further comprising instructions to:

obtain a position of the 3D model on the 3D mesh after adjusting the 3D mesh; and select the second node based on traversal of the 3D model through the adjusted 3D mesh.

21. An article comprising a computer program product having stored therein instructions that are executable to:

generate an original three-dimensional (3D) mesh, the original 3D mesh representing terrain that is traversed by a 3D model in an animation sequence, the original 3D mesh comprising polygons, at least some of the polygons corresponding to nodes of a node graph, wherein when the node graph comprises data that is separate from the original 3D mesh, nodes of the node graph are superimposed over the original 3D mesh and contain data related to vertices of the original 3D mesh, wherein when the node graph comprises data associated with the original 3D mesh, nodes of the node graph are located at centers of polygons of the original 3D mesh or at vertices of the original 3D mesh;

adjust the original 3D mesh changing a size of the polygons;

determine that one or more nodes of significance have been removed from the original 3D mesh as a result of adjusting the original 3D mesh, the one or more nodes of significance for affecting a path of the 3D model through the original 3D mesh, the one or more nodes of significance including at least one of a start node or a destination node of the path, the start node corresponding to a polygon of the 3D mesh and the destination node corresponding to a different polygon of the 3D mesh, the start node and the destination node comprising nodes of the node graph;

assign one or more nodes in the adjusted 3D mesh the significance of the one or more nodes in the original 3D mesh;

run the animation sequence to allow the 3D model to traverse the adjusted 3D mesh taking into account significance of the one or more nodes in the adjusted 3D mesh; and display the animation sequence on a display screen.

22. The article of claim 21, wherein the one or more nodes of significance in the original 3D mesh comprise one of more of a start node from which the 3D model traverses the 3D mesh, a destination node indicating an ending point on a path of the 3D model through the 3D mesh, and a blocking node that defines a point through which the 3D model cannot pass.

23. The article of claim 21, wherein changing the size of the polygons comprises removing vertices of polygons that are interior to the original 3D mesh and connecting unconnected vertices to form polygons in the adjusted 3D mesh that are larger than polygons that existed before the vertices were removed.

24. The article of claim 21, wherein changing the size of the polygons comprises subdividing existing polygons in the original 3D mesh to produce polygons in the adjusted 3D mesh that are smaller than polygons that existed prior to the subdividing.

25. The article of claim 21, wherein the 3D mesh is adjusted while the animation sequence is being run.

26. The article of claim 21, wherein the original 3D mesh is adjusted in response to a change in performance of a hardware platform running the animation sequence in order to maintain a substantially steady frame rate in the animation sequence.

* * * * *